US006923917B1

(12) United States Patent
Hughes

(10) Patent No.: US 6,923,917 B1
(45) Date of Patent: Aug. 2, 2005

(54) PHOSPOROUS REMOVAL FROM ANIMAL WASTE

(75) Inventor: Kristen J. Hughes, Greenbelt, MD (US)

(73) Assignee: University of Maryland, College Park, College Park, MD (US)

(*) Notice: Subject to any disclaimer, the term of this patent is extended or adjusted under 35 U.S.C. 154(b) by 0 days.

(21) Appl. No.: 09/857,419

(22) PCT Filed: Dec. 3, 1999

(86) PCT No.: PCT/US99/28615

§ 371 (c)(1),
(2), (4) Date: Jan. 18, 2002

(87) PCT Pub. No.: WO00/33933

PCT Pub. Date: Jun. 15, 2000

Related U.S. Application Data
(60) Provisional application No. 60/110,876, filed on Dec. 4, 1998.

(51) Int. Cl.$^7$ ................................................ C02F 1/52
(52) U.S. Cl. ..................... 210/702; 210/716; 210/723; 210/906
(58) Field of Search ............................... 210/702, 716, 210/723, 906

(56) References Cited

U.S. PATENT DOCUMENTS

| | | | |
|---|---|---|---|
| 4,267,058 A | * 5/1981 | Kyri et al. ................. 210/716 |
| 4,306,516 A | 12/1981 | Currey | |
| 5,248,497 A | * 9/1993 | Hartmann et al. ........... 423/141 |
| 5,585,078 A | * 12/1996 | Reis et al. .................... 423/74 |
| 5,622,697 A | 4/1997 | Moore, Jr. | |
| 5,626,644 A | 5/1997 | Northrop | |
| 5,928,403 A | 7/1999 | Moore, Jr. | |
| 5,961,968 A | * 10/1999 | Moore, Jr. ................. 424/76.6 |
| 6,328,938 B1 | * 12/2001 | Taylor et al. ................ 423/79 |
| 6,656,363 B1 | * 12/2003 | Nedez et al. ............... 210/660 |

FOREIGN PATENT DOCUMENTS

WO   WO99/04878   *  2/1999

* cited by examiner

Primary Examiner—Chester T. Barry
(74) Attorney, Agent, or Firm—Lowe, Hauptman and Berner, LLP

(57) ABSTRACT

The subject invention is related to a method for removing bio-available phosphorus from animal waste and soil using an industrial byproduct from a metal manufacturing process. The byproduct is used to treat organic waste, such as animal waste and poultry litter, and immobilize bio-available phosphorus present in them. The byproduct is also used to treat organic waste to produce fertilizers, which are used to amend the soil and control the level of phosphorous present in the soil. The disclosed method strikes a balance between providing enough nutrients to the soil to grow crops, while preventing loss of phosphorous to surface water.

40 Claims, 3 Drawing Sheets

PHOSPOROUS REMOVAL FROM ANIMAL WASTE

Figure 1:
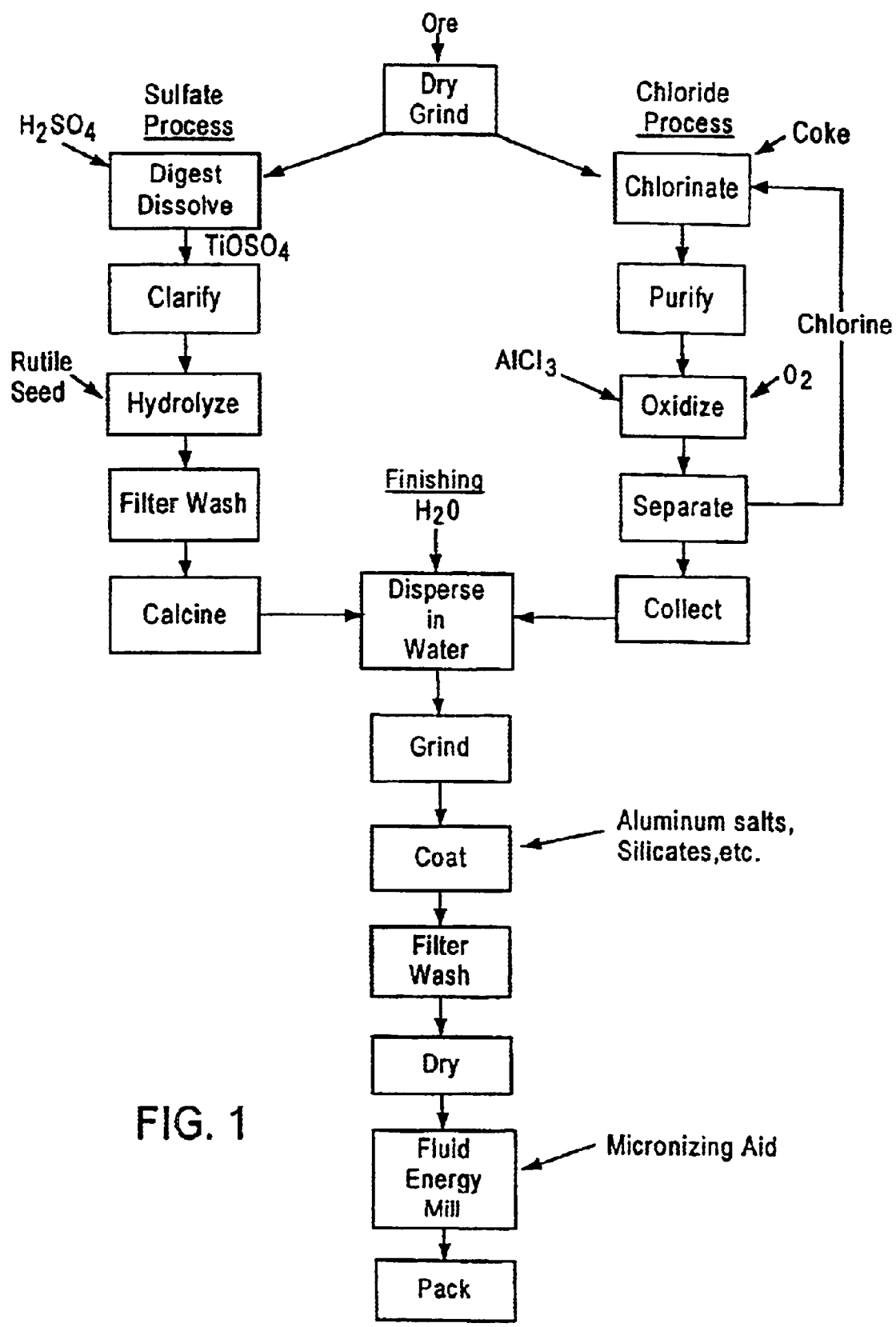

This application is a 371 of PCT/US99/28615, filed Dec. 3, 1999.

This application claims priority to U.S. Provisional Patent Application Ser. No. 60/110,876, filed Dec. 4, 1998, the entire contents of which are incorporated herein by reference.

BACKGROUND OF THE INVENTION

The present invention relates to a method of reducing phosphorus pollution from agricultural runoff. The present invention also relates to a method of immobilizing bioavailable phosphorus in organic waste products using high phosphorus affinity material capable of forming insoluble metal-phosphorus complexes. In addition, the present application relates to a method of making fertilizer comprising a designated amount of phosphorus Although the evidence is circumstantial and inconclusive at this point, it has been suggested that nutrients lost from farm lands through runoff and leaching may be partially responsible for the outbreaks of *Pfiesteria*-like organisms in various rivers along the Atlantic coast. Nutrients enter water from many sources. Sewage sludge, septic tank effluent, organic manufacturing waste, and animal manure contain high concentrations of nitrogen and phosphorus.

Farmers commonly obtain nutrients for their crops from inorganic commercial fertilizers and from organic sources such as animal manure and biosolids from wastewater treatment plants. Generally, inorganic nitrogen and phosphorus compounds are water soluble and readily available to plants. In contrast, most organic nutrient sources contain both inorganic forms of nutrients and forms that must first be mineralized or decomposed to become available to plants. The movement of nitrogen and phosphorus through soil are different. If nitrogen is converted to the highly water soluble nitrate-nitrogen form, and is not used during plant growth, it can move through the soil-water system and be vulnerable to leaching into the groundwater. In the same way, soils amended with large quantities of organic or inorganic phosphorus may generate significant amounts of soluble phosphorus that can be readily transported by surface and subsurface runoff and groundwater leachate.

When organic sources of nutrients are used, the ratios of nitrogen and phosphorus do not usually correlate with the crop's actual nutrient needs. The phosphorus to nitrogen ratio required by plants (1:6) is usually much smaller than the ratio found in manure (1:1–1:2). Hence, nitrogen-based application of manure to agricultural fields results in the application of phosphorus in excess of plant nutrient requirements.

In animal waste, phosphorus occurs in both dissolved (soluble) and particulate forms. Phosphorus losses from agricultural systems, other than by crop removal, generally occur through the following pathways associated with surface water runoff: a) particulate losses either as phosphorus absorbed into soil particles or organic materials, and/or b) soluble inorganic and organic phosphorus compounds.

Various methods have been suggested to reduce soil erosion, which also reduces particulate phosphorus in runoff. These are, among others: no-till farming, contour/strip cropping, grass waterways, buffered streams, and related structural controls. While efforts to reduce sediment in agricultural runoff often reduce particulate phosphorus, they do not reduce losses of dissolved phosphorus, thus increasing the percentage of total phosphorus in runoff that is immediately available for biological uptake. Consequently, recent efforts on improving water quality of surface waters has focused on reducing soluble, bioavailable dissolved phosphorus.

With commercial fertilizers, it is possible to tailor the ratios of nitrogen and phosphorus to meet the crop's nutrient needs. In the past, organic nutrient sources were typically applied to the soil to meet the crop nitrogen requirements, without regard for the phosphorus content in the soil. Nitrogen-based plans have made use of animal wastes, been cost effective, and reduced nitrogen application to land. However, this has resulted in overapplication of phosphorus. These applications frequently occur on soils with that already have high phosphorus content caused by repeated, long-term applications of organic fertilizers. This overapplication increases the potential for phosphorus to move from farmland to nearby water.

One method to reduce soluble phosphorus in runoff and leachate is to base application rates of organic fertilizer sources on the recommended crop phosphorus requirements. Phosphorus-based nutrient management plans can be applied to fields with a very high potential for phosphorus loss to surface water. However, using P-based application of organic fertilizers results in underapplication of nitrogen. In such a situation, additional nitrogen from other sources—most likely commercial nitrogen fertilizers—must be added to supplement the fertilizer. Thus, there is a necessity to develop a system that allows for the optimum use of organic sources of nutrients while maintaining environmental integrity.

In Maryland, soil test phosphorus values will be the critical factor in determining whether animal manure can be applied according to crop nitrogen requirements. For soils that test in the "excessive phosphorus" range, nutrient managers are required to perform a Phosphorus Site Index (PSI) assessment (The Maryland Phosphorus Site Index: A Technical User's Guide (Version I). August 1999. Agricultural Nutrient Management Program and MD Cooperative Extension. Univ. of MD, College Park, Md., which is incorporated herein by reference in its entirety). The PSI takes into consideration factors such as soil test phosphorus, soil type, fertilizer source and phosphorus availability, slope, buffer strips, runoff potential and cropping methods to derive a final rating based on the potential for phosphorus loss to surface waters. The final rating is based on 5 categories (high risk to low risk) on which phosphorus application guidelines are based. A low risk rating will allow for the continued application of manure based on nitrogen requirements, while a medium to high risk rating indicates that phosphorus applications will either be limited to annual crop requirements or eliminated completely.

While phosphorus based application rates of organic fertilizers would be environmentally sound and should begin to limit both phosphorus and nitrogen enrichment of the associated water bodies, this type of planning would have a very serious and potentially expensive impact on farms that generate or use animal manure. Adopting phosphorus-based nutrient management plans would increase operation and crop production costs. Major changes to current farming practices would involve importing of fertilizer nitrogen and exporting of manure. These types of activities can have a significant negative impact on the profitability of any farming system.

Among the significant contributors to the fertilizer industry are the poultry growers. In the poultry industry, approximately 625 million birds (three billion pounds of meat) are raised each year on the Delmarva Peninsula Assuming these flocks are fed according to the National Research Council recommendations, 53 million pounds of manure nitrogen and 22 million pounds of manure phosphorus are excreted per year. Poultry farming therefore represent one of the significant sources of nutrients that have a potential impact on water resources.

Many of the lower Eastern Shore counties in Maryland have inadequate cropland available for efficient utilization of manure phosphorus, therefore, alternative disposal options have been suggested. Transporting nutrients to areas of the state or region where soils do not contain excessive concentrations of phosphorus and where phosphorus inputs are necessary for optimum crop production is one solution. However, distribution is not so much limited by lack of available technology but rather by the economics of transporting manure long distances.

Burning manure is another disposal option. In the early 1980's, Delmarva Power burned broiler litter in their Indian River Generation Facility at Millsboro, Del. However, litter supply still remains a problem. The BTU value of broiler litter is about 6,800 BTU's per pound at 30 percent moisture in a large fluid bed burner. The ash content for broiler litter is approximately 11.3 percent. This shows a large volume and weight reduction. Burning raw litter in small on-farm furnaces has presented some problems such as slag formation because of incomplete combustion, odors, particulate, and loading difficulties.

Regardless of any other measures either to reduce the phosphorus content of manure or to find alternative uses for manure, these actions will have no effect on soils that already have high phosphorus levels and are at risk for phosphorus losses to the surrounding environment through surface water. However, remediation of high-phosphorus soils has never been implemented on a large scale. Hence, no standard practice exists.

Methods of removing excess phosphorus from the soil include using crops, and tillage methods. Since plants take up phosphorus, growing crops without adding phosphorus to the soil provides an income source (crops) and leaves the soil undisturbed. However, this process will require the application of nitrogen, which is an expense to the farmer, as well as having a pollution potential of its own.

A novel variation of mining phosphorus through crop removal, called phytoremediation, is being explored for removing inorganic contaminants from soil. Phytoremediation, or "Green Remediation" uses unusual plants that have developed the ability to concentrate high levels of elements, usually heavy metals, in plant tissue. The primary limitation of phosphorus phytomining is no one has identified reliable phosphorus hyperaccumulators.

Tillage, an immobilization technique, would place the phosphorus-rich surface soil well below the surface and out of reach of surface runoff water, hence effectively stopping surface transport of phosphorus. The phosphorus would be below the surface but still within the root zone, enabling it to be taken up by plants over time. One major concern is that the soil that would be brought to the surface must be equally good for crop production, or else, it would create a permanent liability for the farmer. Furthermore, the subsurface soils that are brought to the surface must also be low in phosphorus or tillage will have no impact. The ramification of this is that extensive soil testing of the deeper soil would be necessary prior to performing tillage, and it would not be suitable on some farms.

Thus, there exists a need in the agriculture field for a more effective and cost-efficient method for immobilizing phosphorus without harming the environment.

Turning to an unrelated field, in the metal refining or manufacturing industry, byproducts are considered environmental hazards. In the titanium dioxide pigment manufacturing process, for example, there can be mentioned two refining or manufacturing methods—sulfuric acid and chlorine. Both of these known industrial methods, however, involve environmental pollution, although the chlorine method pollutes somewhat less.

The sulfate method is a relatively low-technology, batch manufacture process, and is described in U.S. Pat. No. 4,186,088, which is incorporated herein by reference in its entirety. The sulfuric acid method is advantageous for refining titanium because the starting titanium-containing material is not particularly limited, and an ore having a titanium oxide content of 50 to 60% by weight, for instance, ilmenite, can be used as the starting material. But large quantities of wastes are formed. More specifically, it is said that 3 to 4 tons of iron oxide hydrate and about 8 tons of dilute sulfuric acid are formed for 1 ton of titanium oxide produced. Environmental concerns prohibit discarding these wastes formed in such large quantities into rivers or seas. Further, if these wastes are treated again in a particular treatment plant to recover valuable resources, the manufacturing cost is inevitably increased. It is said that the manufacturing cost is increased by about 15% by this treatment of the wastes.

The chlorine method, on the other hand, is a relatively high technology, continuous process. If the chlorine method is adopted for the production of titanium oxide, the problem of wastes is not so acute. The raw material used in the method is typically a rutile ore having a titanium oxide content of at least 90% by weight. A high purity rutile ore such as mentioned above is reacted with chlorine gas to form titanium tetrachloride, which is reacted with oxygen to form titanium oxide and chlorine. The byproducts of these industrial metal-refining processes are typically rich in iron.

The metals refined by the above processes are filtered, washed, and dried. The dried pigments are treated with organic solvents, ground, and packed or slurried with appropriate dispersants.

The chlorine and sulfuric acid processes for making metal oxides, such as $TiO_2$, are described in Braun et al., "$TiO_2$ pigment technology: a review," *Progress in Organic Coatings*, 20, 105–138 (1992), and Braun, "Titanium Dioxide—A Review," *Journal of Coatings Technology*, Vol. 69, No. 868, 59–72, (1997), which are incorporated herein by reference in their entirety.

The discharges of the metal refining process, such as in the titanium dioxide pigment manufacturing process discussed above, which include iron compounds, dilute acids and miscellaneous inorganic contaminants of the ore, have become international environmental issues. The cost of waste disposal has been responsible for large increases in the manufacturing costs of the pigments made from titanium dioxide. Currently, these byproducts are disposed of in landfills. This is not a satisfactory solution to the waste disposal problem because landfilling the byproduct does not benefit the environment and is costly to the manufacturing companies.

Offiah, O. and D. S. Fanning. 1994. Liming value determination of a calcareous, gypsiferous waste for acid sulfate soil. *J. Environ. Qual.* 23:331–337 discloses adding lime to calcareous and gypsiferous soil to raise the pH of the soil. However, the reference does not disclose removing phosphorus from the soil using the calcium and iron containing mixture such as an industrial byproduct of a metal refining or manufacturing process of the invention.

Hughes, K. J. and L. R. Cooperband. 1998. SWAN-gypsum as a potential soil amendment for reducing phosphorus in a constructed wetland receiving milking parlor effluent. 1998 *Annual meeting abstracts. ASA, CSSA and SSSA*. Baltimore, Md. October 18–22, is directed to mixing SWAN-gypsum with a constructed wetland soil. However, the reference does not disclose using the inventive composition as a direct additive to agricultural soil, animal waste, or liquid waste to remove phosphorus.

Hsu, P. H. 1976. Comparison of iron (III) and aluminum in precipitation of phosphate from solutions. *Water Research*. 10:903–907, reported that the optimum phosphorus removal by Fe occurred in the pH range of (4.1–7.1), while optimum phosphorus removal by Al occurred in the pH range of (5.5–8.0). However, the reference does not disclose using the inventive composition for treating agricultural soil, animal waste, or liquid waste to remove phosphorus.

Cooke, G. D. et al. 1986. *Lake and reservoir restoration*. Ann Arbor Science Book, Boston, Mass. also demonstrated phosphorus removal by sorption on aluminum hydroxide surfaces in a pH range of 6 to 8. Even in solutions with low concentration of $Ca^{2+}$, phosphorus removal can occur via adsorption onto calcite surfaces. However, the reference does not disclose using the inventive composition for treating agricultural soil, animal waste, or liquid waste to remove phosphorus.

Moore, Jr., P. A., and D. M. Miller. 1994. Decreasing phosphorus solubility in poultry litter with aluminum, calcium and iron amendments. *J. Environ. Qual.* 23: 325–330 is directed to methods for reducing soluble phosphorus in poultry litter with aluminum, calcium and iron amendments. However, the reference does not disclose using the inventive composition for treating agricultural soil, animal waste, or liquid waste to remove phosphorus.

EP 0 650 515 B1 discloses producing a binding agent made of gypsum, titanium hydroxide and iron hydroxide compounds that are used for stabilizing and strengthening soil or clay so that buildings can be constructed on the modified soil. The reference is unconcerned with phosphorus removal.

Barksdale, *Titanium, Its Occurrence, Chemistry, and Technology*, second edition, The Ronald Press Co., NY (1966), describes the chemistry of titanium as well as the sources of titanium and its extraction and manufacture. This reference is incorporated herein by reference in its entirety.

Fitch et al. (U.S. Pat. No. 4,186,088) is directed to a process of neutralizing the waste stream from a sulfuric acid-based extraction procedure from titanium containing ores. A byproduct of the secondary neutralization operation, in particular, has neutral pH and has low concentrations of metals, excluding iron which is present at levels in excess of 10%. The patent does not discuss removing phosphorus from animal waste using the byproducts that are described. U.S. Pat. No. 4,186,088 is incorporated herein by reference in its entirety for its description of the process of neutralizing the waste stream obtained through the titanium extraction process, thereby obtaining the byproduct Secondary Waste Acid Neutralization, or SWAN, gypsum.

Thus, there remains a need in the farming, animal growing and nutrient management industries for a method of removing or immobilizing bio-available phosphorus from animal waste such as poultry litter so that such animal waste can continue to be applied to the field and used as primary nitrogen source for crops, while minimizing loss of phosphorus to surface water. There is also a need in the metal oxide manufacturing industry, such as titanium dioxide, for an environmentally safe and cost-effective method of disposing of industrial byproducts.

SUMMARY OF THE INVENTION

The present invention has met the hereinbefore-described need.

For the first time, a process has been developed that solves two problems in two different fields—overabundance of bio-available phosphorus in certain soil and organic waste that leads to the phosphorus in runoff water, and waste disposal problem generated by the metal manufacturing process, such as titanium dioxide. The solution involves using heretofore considered unusable byproducts of the metal oxide manufacturing process to immobilize bio-available phosphorus present in the soil and organic waste. The abundant quantity of byproduct that is produced as industrial waste from metal manufacture, such as $TiO_2$, can be applied directly at a commercial level in fields or waste water that are rich in phosphorus, or in organic waste that can be turned to fertilizer, thus aiding agricultural enterprises to achieve optimum crop yield and reduction in bio-available content of the soil. For the metal manufacturing industry, the result is environmentally safe disposal of the byproduct, with the added benefit of savings in the cost of disposal by creating a market for the byproducts.

Accordingly, the invention is directed to a method for reducing an amount of bio-available phosphorus in an organic waste product, liquid wastewater or soil, comprising adding to the organic waste product, liquid wastewater or soil a composition or mixture comprising a byproduct from an industrial metal manufacturing process in an amount sufficient to immobilize some or all of the phosphorus present in the organic waste product, liquid wastewater or soil. The byproduct may be from a transition metal manufacturing process. Preferably, the byproduct is from a titanium dioxide manufacturing process. According to the method of the invention, the byproduct may be a secondary waste acid neutralization gypsum or iron oxide filter cake. The organic waste product may be an animal waste. Preferably, the animal waste is poultry litter. If the byproduct is used to remove phosphorus from liquid wastewater, the resulting precipitate, which may be suitable for land application, is also included. Also, the byproduct can be an aggregate of byproducts obtained through the completion of the metal manufacturing process.

The invention is also directed to a method for improving water quality of surface-, subsurface-, or ground-water by reducing the amount of soluble phosphorus in a soil from which said water originates, comprising amending the soil surface to include a mixture comprising a byproduct from industrial metal manufacturing process. The byproduct may be from a transition metal manufacturing process. Preferably, the byproduct is from a titanium dioxide manufacturing process. More preferably, the byproduct is secondary waste acid neutralization gypsum or filter cake. In this method, the organic waste product may be animal waste. Preferably, the animal waste is poultry litter. Also, the byproduct may be an aggregate of byproducts obtained through the completion of the metal manufacturing process.

In another aspect of the invention, the invention provides a method for controlling the growth of an organism in a body of water to which surface-, subsurface- or ground-water flows, by reducing an amount of soluble phosphorus in a soil from which said water originates, comprising amending a soil surface to include a mixture comprising a byproduct from an industrial metal refining process. The organism that is controlled may be a nuisance, toxic, or detrimental organism. Preferably, the organism is unicellular. More preferably, the organism is an algae, bacteria, or protist. Even more preferably, the organism to be controlled is *Pfiesteria*, and in particular, *Pfiesteria piscidia*. It is generally understood that the flow of phosphorus into a body of water will cause the growth of numerous types of organisms, especially as the influx of phosphorus contributes to the eutrophication of the body of water. Therefore, controlling the phosphorus content in the surface runoff or leachate will control the growth of any organism that is enhanced by the presence of excess phosphorus or eutrophication of the body of water to which the runoff or leachate flows.

In this method, the byproduct may be obtained from a transition metal manufacturing process. Preferably, the byproduct may be obtained from a titanium dioxide manufacturing process. More preferably, the byproduct is secondary waste acid neutralization gypsum or filter cake. In this method, the organic waste product may be animal waste. The animal waste may be poultry litter. And in this method, the organism to be controlled may be *Pfiesteria*.

The invention is also directed to a method for optimizing crop yield and phosphorus content in a soil, comprising:

i) determining the amount bio-available phosphorus present in the soil; and ii) if the amount of phosphorus determined in step i) is too high and it is desired to control the phosphorus content, an organic waste that has been amended with a phosphorus immobilizing amount of a byproduct of an industrial metal manufacturing process, is added to the soil thereby keeping nitrogen content in the organic waste sufficient to fertilize the crop, but controls the amount of bio-available phosphorus in the soil.

These and other objects of the invention will be more fully understood from the following description of the invention, the referenced drawings attached hereto and the claims appended hereto.

BRIEF DESCRIPTION OF THE DRAWINGS

FIG. 1—A flow chart of titanium dioxide manufacturing process.

FIG. 2—Phosphorus sorption isotherm for SWAN-gypsum and Iron Oxide Filter Cake

FIG. 3—Percent reduction in soluble phosphorus vs. poultry litter to SWAN or FC amendment rate. Results are from a one-week incubation modeled after methods described in Moore, Jr., P. A., and D. M. Miller. 1994. Decreasing phosphorus solubility in poultry litter with aluminum, calcium and iron amendments. *J. Environ. Qual.* 23: 325–330, which is incorporated herein by reference in its entirety.

FIG. 4—Percent reduction in soil test phosphorus vs. poultry litter to SWAN or FC amendment rate. Results are from a one-week incubation modeled after methods described in Moore and Miller (1994) cited above, which is again incorporated herein by reference in its entirety.

DETAILED DESCRIPTION OF THE INVENTION

As used herein, the phrase "calcium and iron containing mixture" includes any mixture that contains calcium and iron. The calcium may be in any form, such as $CaSO_4$, $CaCO_3$, or any other combination with any other molecule thereof, including anhydrous and hydrated forms. The iron can be in any form, such as iron oxides or hydroxides. The calcium and iron containing mixture, when used with liquid waste, preferably does not significantly alter the solution pH. In a preferred embodiment, due to the presence of both iron and calcium, the mixture effectively sorbs phosphorus in both acidic and alkaline environments, preferably in a range of about pH 4.5–8.5.

Considering the problems associated with pH adjustment, an ideal phosphorus sorbing material should effectively remove phosphorus from solutions with neutral to slightly alkaline pH ranges typical of farm wastewater, while also maintaining the ability to sorb phosphorus in acidic environments.

According to the invention, the amount of the calcium and iron containing mixture that is mixed with the organic waste in order to remove the bio-available phosphorus is determined according to the need for any particular amount of bio-available phosphorus that is desired to remain in the organic waste. That is, the amount of the calcium and iron containing mixture admixed with the organic waste sample is increased with the desire to decrease the amount of phosphorus in the organic waste. If a greater level of phosphorus is desired to be left in the organic waste, then fewer amounts of the calcium and iron-containing mixture is added to the organic waste.

In another embodiment of the invention, a calculation of the amount of the calcium and iron containing mixture required to attain a particular level of phosphorus in an organic waste sample is carried out, and a mathematical formula can be set forth which describes and predicts the amount of phosphorus remaining in an organic waste sample after treatment In turn, the amount of phosphorus that is desired to remain in the organic waste sample depends upon the phosphorus requirement of the soil that is to be amended.

In one embodiment of the invention, "calcium and iron containing mixture" refers to a byproduct of an industrial metal oxide manufacturing process. Preferably, the metal is a transition metal. More preferably, the metal belongs to Group 4. Most preferably, the metal is titanium.

Metal manufacturing processes may differ between different metals. However, any metal or metal oxide manufacturing process which produces large-scale, commercially applicable amounts of byproducts that immobilize bio-available phosphorus in soil or organic waste, that are optionally rich in calcium and iron, and which are suitable as soil additives alone or in combination with organic waste, as defined by the Environmental Protection Agency guidelines, falls within the method of the invention.

Although the total amount of byproducts in the aggregate obtained through the completion of the manufacturing process can be used in the method of the invention, it is also possible, and at times preferable, that selected byproducts obtained at certain points in the manufacturing process be used individually or together. For example, it can be readily seen that a person of skill in the art could analyze the byproduct from each reaction step, and depending on the results of the analysis, and optionally with the knowledge of the starting material and all materials used in the manufacturing process, may favor using certain byproducts in the method of the invention, depending on the desires and needs of the person.

It is to be understood from the above that the amounts of iron and calcium present in the byproduct of the industrial metal or metal oxide manufacturing process is necessarily subject to variability depending on the amount of chemical ingredients such as calcium and iron present in the starting material, such as in the metal-containing ore, coke, or slag used throughout the refining or metal oxide manufacturing process. Therefore, it is understood by a person of ordinary skill in the art that the presence of various chemical ingredients in the byproduct may not adhere to any specific concentration range, so long as the byproduct binds bio-available phosphorus present in waste liquid, soil, or organic waste.

It is also understood that any additive or component may be added or mixed with the byproduct to carry out the process of the invention so long as the composition or mixture possesses the property of binding phosphorus.

As used herein, the phrase "filter cake (FC)" or "iron oxide filter cake (FC)" is a byproduct of the chlorine-based metal oxide, preferably titanium oxide, refining process. Preferably, iron oxide filter cake refers to the solid residue, which remains after $TiO_2$ has been extracted from the ore (or coke or slag) feedstock in the chloride manufacturing process. The filter cake is comprised of calcium in an amount of 0–100% by weight, preferably, 0–20%, and more preferably, 2–10%. Most preferably, filter cake includes calcium in an amount of about 5% by weight. The filter cake comprises iron in an amount of 0–100% by weight, preferably, 5–75%, and more preferably, 10–20%. Most preferably, filter cake includes iron in an amount of about 15% by weight.

As used herein, the phrase "secondary waste acid neutralization (SWAN) gypsum" means a byproduct resulting from neutralization of the acidic waste stream resulting from the sulfuric acid process of extracting titanium dioxide from ore. This process is described and set forth as the product of 'secondary neutralization operation' in U.S. Pat. No. 4,186,088, which is incorporated herein by reference in its entirety. SWAN-gypsum is comprised of calcium in an amount of 0–100% by weight, preferably, 10–75%, and more preferably, 15–50%. Most preferably, SWAN-gypsum includes calcium in an amount of about 23% by weight. SWAN-gypsum comprises iron in an amount of 0–100% by weight, preferably, 5–75%, and more preferably, 10–20%. Most preferably, SWAN-gypsum includes iron in an amount of about 11% by weight. Most preferably, SWAN-gypsum includes 725±51 g $kg^{-1}$ gypsum, 132±38 g/kg aragonite ($CaCO_3$), 104±22 g $kg^{-1}$ of goethite (FeOOH), and 22±7 g $kg^{-1}$ residue comprised of quartz ($SiO_2$), rutile ($TiO_2$) and anatase ($TiO_2$).

As used herein, the phrase "organic waste" includes any carbon containing byproduct of a natural or artificial process, such as decay of once living organisms or passage of organic matter through animals. Preferably, the organic waste is animal manure or biosolids from wastewater treatment plants. More preferably, the organic waste is poultry litter, and even more preferably, the organic waste is chicken litter. In particular, the organic waste is solid waste. However, liquid waste is also included.

As used herein, the term "bio-available phosphorus" means dissolved inorganic phosphorus, and includes, but is not limited to, orthophosphate.

As used herein, "soil test phosphorus" refers to any soil test procedure used to measure soluble, total or plant available phosphorus. Common soil phosphorus tests include Mehlich 1 or 3.

As used herein, "amendment rate" refers to the ratio of organic waste or soil to the amendment on a dry weight basis, such as the ratio of poultry litter to SWAN or FC on a dry weight basis. For example, an amendment rate of 2:1 represents two parts of organic fertilizer or soil to 1 part of poultry litter as measured by dry weight. Or, a ratio of poultry litter to amendment of 3:1 would be an amendment rate of "3".

The amendment ratio for a soil or organic fertilizer source depends on several conditions: (1) desired phosphorus application rate, and (2) phosphorus content of fertilizer source. The first step in determining an organic fertilizer source to amendment ratio is to obtain a soil test phosphorus analysis. Based on these and the desired phosphorus application rate, the amendment rate is based on either: (1) previous research on a similar organic fertilizer source (such as incubation experiments) that establish amendment rates and reduction in soluble phosphorus, or if no previous incubation experiments exist, (2) incubation experiments with the organic fertilizer source.

Although any calcium and iron containing mixture or composition, or preferably an industrial byproduct from a metal refining process, can be used in the invention, SWAN-gypsum and iron oxide FC will be described by way of illustration. It will be appreciated by those skilled in the art, that calcium and iron containing mixture or composition is not limited by the exemplified species of SWAN-gypsum and iron oxide FC presented herein, as these compositions are presented solely for illustrative purposes, and is not meant to limit the invention in any way.

Figure 3:
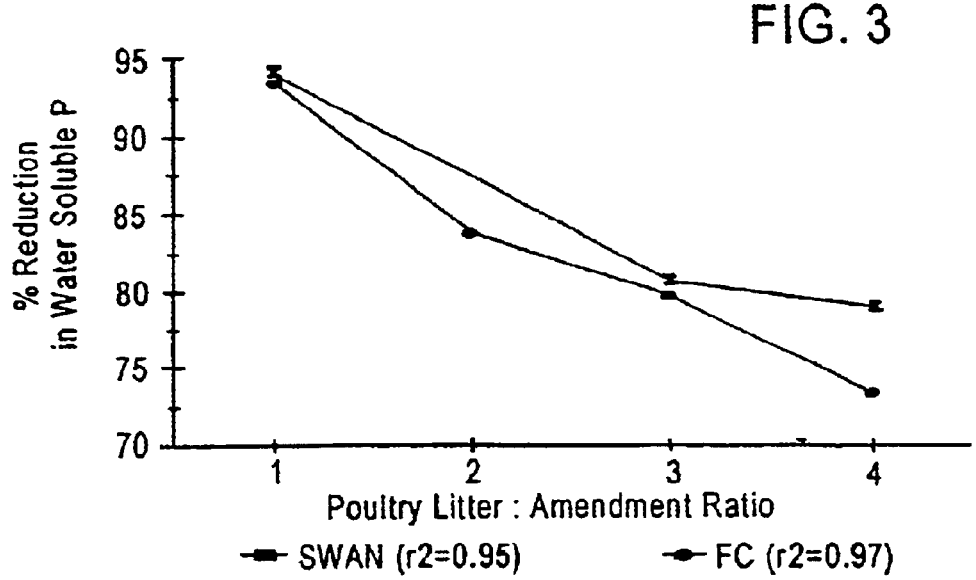
Figure 4:
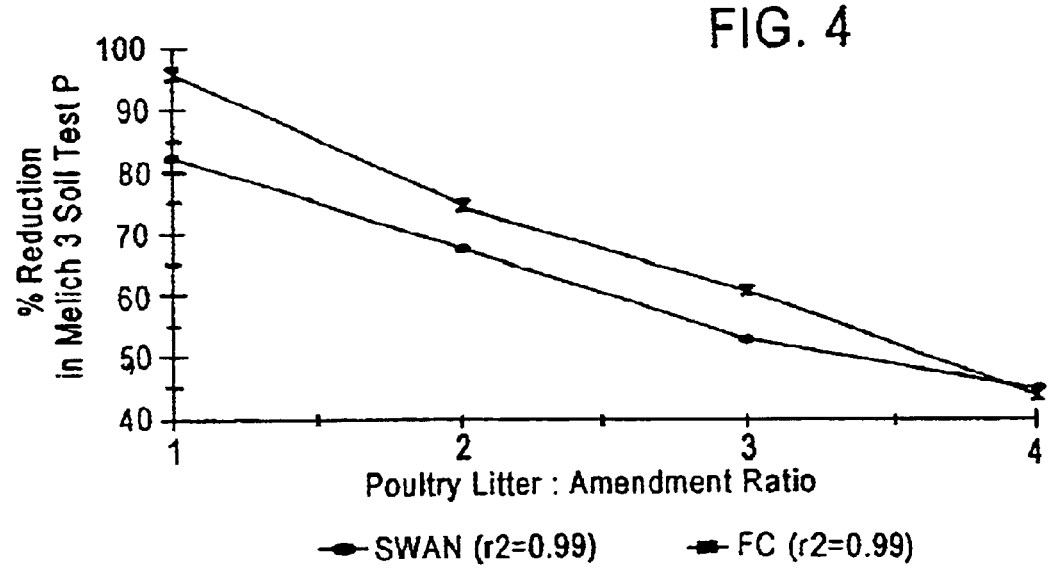

Results from research with calcium and iron containing mixtures, particularly with SWAN-gypsum and iron oxide filter cake, indicates that both materials have a high phosphorus affinity and can significantly reduce the amount of soluble phosphorus in manure. Modeled after methods described in Moore and Miller (1994), which is cited above, and is incorporated herein by reference in its entirety with respect to the incubation protocol, one week incubation experiments with various ratios of SWAN or FC to poultry litter demonstrated an inverse relationship between amendment rate and reduction of water soluble phosphorus and soil test phosphorus (FIGS. 3 and 4). This relationship can be used to determine a soil and crop specific poultry litter to SWAN or FC amendment ratio suitable for application of poultry litter based on crop nitrogen requirements.

Soil test phosphorus value is the critical factor in determining whether animal manure can be applied according to crop nitrogen requirements. For soils that test in the "excessive phosphorus" range, nutrient managers are required to perform a Phosphorus Site Index (PSI) assessment (Maryland Phosphorus Site Index: Volume I, 1999 cited above, which is incorporated herein by reference in its entirety). The PSI takes into consideration factors such as soil test phosphorus, soil type, fertilizer source and phosphorus availability, slope, buffer strips, runoff potential and cropping methods to derive a final rating based on the potential for phosphorus loss to surface waters. The final rating is based on 5 categories (high risk to low risk) on which phosphorus application guidelines are based. A low risk rating will allow for the continued application of manure based on nitrogen requirements, while a medium to high risk rating indicates that phosphorus applications will either be limited to annual crop requirements or eliminated completely.

The two parameters that have the most significant impact on the final PSI rating are soil test phosphorus and the phosphorus availability coefficient of the fertilizer source (Maryland Phosphorus Site Index: Volume I, 1999). Amending soils with calcium and iron containing compositions or mixtures, such as SWAN or FC, will reduce soil test phosphorus values. Amending manure with SWAN and FC will reduce values for soil test phosphorus and the phosphorus availability coefficient. Using SWAN and FC amended manure, soils that do not currently test in the excessive phosphorus range can maintain soil test phosphorus levels within acceptable limits. Alternatively, SWAN or FC is used to remediate soils that fall into the PSI ranking for high risk of phosphorus runoff. Ultimately, soil amendments such as SWAN and FC are used as a tool by both nutrient managers and farmers to allow for greater flexibility in the use of manure as agricultural fertilizers.

Accordingly, in one embodiment of the invention, relationships are established between SWAN and FC amendment rates and reduction in the amount of soluble and soil test phosphorus for poultry litter and a variety of soils. In another embodiment of the invention, methods are developed for determining rates of amendment based on soil test phosphorus, poultry litter application rate and plant nutrient requirements.

The following examples are offered by way of illustration of the present invention, and not by way of limitation.

EXAMPLES

Example 1

SWAN or FC Adsorption Isotherms

In soils, the primary soluble phosphorus retention mechanisms are soil adsorption and mineral precipitation. Because it is often difficult to discern which process is occurring in soils, the term "sorption", which includes adsorption and precipitation, is used. Adsorption of phosphorus occurs via ligand exchange on surfaces of clay particles, organic peat, and calcium, ferric and aluminum oxides and hydroxides. This occurs when oxygen or hydroxyl ($OH^-$) ions are replaced by the phosphate anion ($PO_4^-$). Under certain conditions, precipitation of phosphorus can occur with iron, aluminum and calcium cations. As sorption sites and cations capable of precipitating soluble phosphorus are finite, continual, long-term application of animal waste results in the accumulation of phosphorus in surface soils and subsequent increase in phosphorus loss via runoff and erosion.

The nature of the phosphorus precipitate compounds formed depends on pH and relative concentrations of free $Ca^{2+}$, $Fe^{3+}$, and $Al^{3+}$, although reduced conditions limit the concentration of $Fe^{3+}$ (ferric iron) via reduction of $Fe^{3+}$ to $Fe^{2+}$ (ferrous iron). In acidic soils (below pH 5.5), ferric iron and aluminum phosphorus compounds predominate with a minimum solubility at pH 3–4. Even at a pH of 6.5, much of the phosphorus is still combined with iron and aluminum. Calcium phosphate precipitates begin to occur at a pH of 6, and at pH 6.5 the formation of calcium salts is a significant factor in immobilizing phosphorus. Above pH 7.0, tricalcium phosphate ($Ca_3(PO_4)_2$) complexes predominate and over time, even more insoluble calcium phosphate compounds such as apatites are formed.

While phosphorus precipitation by free $Ca^{2+}$, $Fe^{3+}$, and $Al^{3+}$ is pH dependent, fixation of phosphorus by adsorption onto clay surfaces and hydroxides and oxides of Ca, Fe, and Al occurs over a comparatively wide pH range. In acidic to neutral soils, phosphorus fixation is dominated by amorphous aluminum hydroxides and iron oxides.

Figure 2:
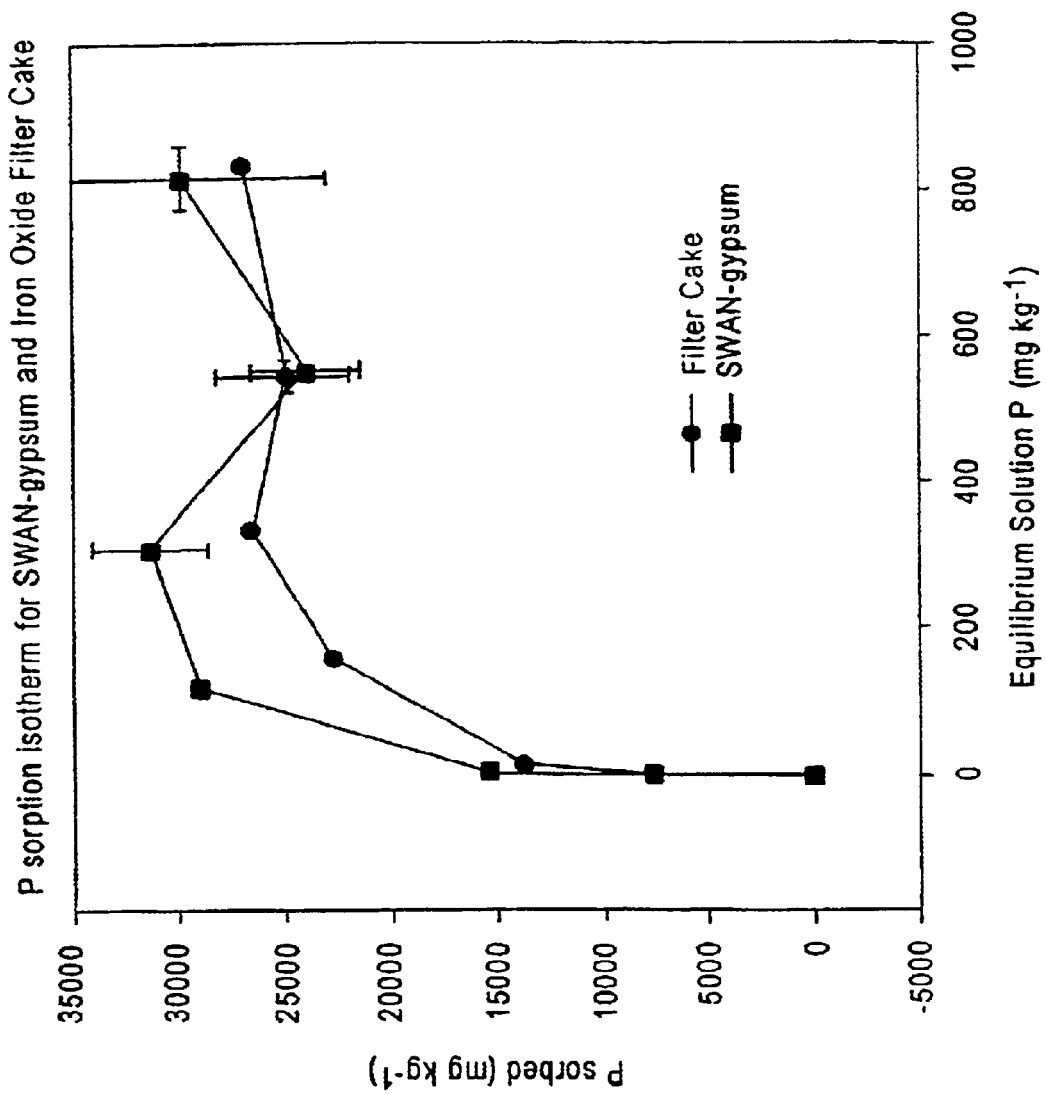

Phosphorus sorption capacity of SWAN or FC is measured and compared using adsorption isotherms and two widely utilized equilibrium-based adsorption models, the Langmuir and Freundlich equations. Adsorption isotherms describe the relationship between the activity or equilibrium solution concentration of the cation or anion in question and the quantity of the ion adsorbed on the surface at constant temperature (Sparks, *Environmental Soil Chemistry*. Academic Press. New York, 1995). Adsorption isotherms are constructed by equilibrating a given amount of the SWAN or FC with a set volume of solutions that vary in phosphorus concentration. Initial phosphorus concentration minus equilibrium solution concentration is assumed to be removed by the SWAN or FC. FIG. 2 shows phosphorus sorption isotherm for SWAM-gypsum and iron oxide filter cake.

Example 2

SWAN or FC in Treatment of Liquid Wastewater

Determination of appropriate SWAN or FC application rate is based on phosphorus content of the wastewater and the phosphorus removal rate of SWAN or FC for that particular wastewater. Nutrient analysis is used to determine the phosphorus content of wastewater. Laboratory bench top experiments are used to establish the required concentration of the amendment per volume of wastewater. Laboratory bench top experiments would also establish contact time necessary for phosphorus removal to occur.

Example 3

Suitability of SWAN-gypsum and Filter Cake as Soil Amendments

The potential for trace metal contamination from SWAN-gypsum, filter cake and poultry litter was evaluated using the Resource Conservation and Recovery Act (RCRA) Toxicity Characteristic Leaching Procedure (TCLP, SW-846 Method 1311). Samples were prepared using a leaching fluid of pH 4.93±0.05, which approximates the lowest acidity expected in Maryland agricultural soils. Final pH of the solution extracts was approximately 7. Analysis was performed using Inductively Coupled Plasma Emission Spectrometry (ICPES) and Cold Vapor Atomic Absorption Spectrometry (CVAAS) in accordance with SW-846 Methods 6010B and 7470A respectively. Table 1 shows the results of these analysis:

TABLE 1

Results of TCLP Analysis.

| Element | TCLP Limit (mg/L) | SWAN gypsum (mg/L) | Filter Cake (mg/L) | Poultry Litter (mg/L) |
| --- | --- | --- | --- | --- |
| Arsenic | 5 | <0.5 | <0.5 | 1 |
| Barium | 100 | <5 | <5 | <5 |
| Cadmium | 1 | <0.05 | <0.05 | <0.05 |
| Chromium | 5 | <0.1 | <0.1 | <0.2 |
| Lead | 5 | <0.5 | <0.5 | <0.5 |
| Mercury | 0.2 | <0.01 | <0.01 | <0.01 |
| Selenium | 1 | <0.5 | <0.5 | <1 |
| Silver | 5 | <0.05 | <0.05 | <0.05 |

Results for all three materials fall well below regulatory limits.

Total metal concentrations of metals in both SWAN-gypsum and filter cake byproducts also meet the Environmental Protection Agency (EPA) guidelines for land application (40 C.F.R. Ch. 1, Part 503, Jul. 1, 1998 Edition), see Table 2.

TABLE 2

Results of Total Metals Analysis.

| Pollutant | Ceiling Concentration (Table 1 of 40 CFR 503.13 μg/g dry weight | SWAN gypsum μg/g dry weight | Filter Cake μg/g dry weight |
|---|---|---|---|
| Arsenic | 75 | <0.2 | 4.0 |
| Cadmium | 85 | <0.2 | <0.2 |
| Chromium | 3,000 | 1,210 | 2,200 |
| Copper | 4,300 | <1.0 | <1.0 |
| Lead | 840 | <8.0 | <8.0 |
| Mercury | 57 | <0.08 | <0.08 |
| Nickel | 420 | 8.20 | 234 |
| Selenium | 100 | <0.2 | 0.896 |
| Zinc | 7,500 | 20.7 | 40.6 |

Total metal concentrations represent a worst case scenario in that they are obtained in the laboratory using extremely rigorous digestion conditions (pH<1). It is unlikely that such conditions would be encountered in agricultural use. Furthermore, due to its high calcium carbonate content (about 22.3%), SWAN-gypsum is expected to partially neutralize slightly acidic soil conditions when used in land-based applications. Its liming capacity was effectively demonstrated by Offiah, O. and D. S. Fanning. 1994 Liming value determination of a calcareous, gypsiferous waste for acid sulfate soil. *J. Environ. Qual.* 23:331–337, which is incorporated herein by reference in its entirety.

Table 3 provides more comprehensive results of total metals analysis of SWAN-gypsum and filter cake.

TABLE 3

Total metal analysis of SWAN-gypsum and Filter Cake as reported by Millennium Inorganic, Inc. using Inductively Coupled Plasma Emission Spectrometry (ICPES).

| Element | Concentration in SWAN-gypsum (mg kg$^{-1}$) on dry weight basis | Concentration in Filter Cake (mg kg$^{-1}$) on dry weight basis |
|---|---|---|
| Al | 13,450 | 25,900 |
| As | <0.1 | Not determined |
| Ba | 23 | 193 |
| Cd | 0.3 | <0.40 |
| Ca | 231,000 | 44,900 |
| Cr | 1,300 | 2,200 |
| Cu | <0.1 | 85 |
| Fe | 111,000 | 195,200 |
| Hg | 0.1 | Not determined |
| K | 46 | 83.9 |
| Mg | 2,700 | 17,000 |
| Mn | 1,590 | 368,800 |
| Na | 616 | 3,500 |
| Ni | 8.9 | 327 |
| S | 194,000 | 4,300 |
| Se | <0.1 | Not determined |
| Si | 367 | 27,300 |
| Ti | 17,500 | 77,000 |
| V | 3,380 | 8,100 |
| Zn | 31 | 47.3 |

Example 4

Incubation Experiments

The relationships between amendment rate, time and reduction of soluble phosphorus, and soil test phosphorus for poultry litter and soils commonly found in the Maryland region are investigated using a modified version of incubation experiments as described by Moore and Miller (1994). SWAN-gypsum and iron oxide filter cake are mixed with the following: (1) soils with elevated STP levels, (2) soils amended with poultry litter and (3) poultry litter only. Each mix is evaluated with 5 different amendment rates of SWAN and FC and three replications. The amended soils/poultry litter is incubated in the dark at 25° C. with soil moisture maintained at field capacity. Sub-samples are removed initially and at weekly intervals until a plateau is observed in reduction of soluble phosphorus vs. time. Samples are analyzed for pH (1:1 soil:water), electrical conductivity, water soluble phosphorus (as described in Moore and Miller, 1994) and Mehlich 3 extractable phosphorus (Mehlich, A. 1985. Mehlich 3 soil test extractant: a modification of Mehlich 2 extractant. *Commun. In Soil Sci. Plant Anal.* 15(12): 1409–1416, which is incorporated herein by reference in its entirety) and trace metals. Results from Mehlich 3 extractions are used in the calculation of appropriate amendment rates for SWAN and FC.

Example 5

Greenhouse Plant Experiments

The influence of SWAN and FC on the growth of corn and soybeans are investigated using greenhouse pot experiments. Based on results from incubation experiments, both SWAN amended and FC amended soils poultry litter are investigated for their effect on plant growth as compared with plants grown in soils amended with poultry litter only. Methods used in this experiment are similar to those described in Tsadilas, C. D., Theodora Matsi, N. Barbayiannis, and D. Dimoyiannis. 1995. Influence of sewage sludge application on soil properties and on the distribution and availability of heavy metal fractions. *Commun. Soil. Sci. Plant Anal.* 26(15&16): 2603–2619, which is incorporated herein by reference in its entirety. Anion exchange membranes are used to measure soil solution phosphorus concentrations in situ (Cooperband, L. R. and T. J. Logan. 1994. Measuring in situ changes in labile soil phosphorus with anion-exchange membranes. *Soil Sci. Soc. Am. J.* 58:105–114, which is incorporated herein by reference in its entirety) to verify that soil solution phosphorus concentrations are acceptable for plant nutrient requirements. In addition, soil test phosphorus is measured initially and at monthly intervals throughout the duration of the experiment. Samples of plant material from both control and treated soils are ground and analyzed for trace metals according to methods described by (Jones, Jr., Benton, J. B. Wolf, and H. A. Mills. 1991. *Plant Analysis Handbook A Practical Sampling, Preparation, Analysis, and Interpretation guide.* Micro-Macro Publishing, Inc., Athens, Ga., incorporated herein by reference in its entirety).

Example 6

Rainfall Simulation Experiments

A rainfall simulator is used to investigate the effect of SWAN and FC on soluble phosphorus in surface runoff. The literature indicates that the potential for soluble phosphorus migration is the highest immediately following manure application, and exponentially declines thereafter (Edwards, D. R., L. D. Norton, T. C. Daniel, J. T. Walker, D. L. Ferguson, and G. A. Dwyer. 1992. Performance of a rainfall simulator for water quality research. *Arkansas Farm Res.* 41(2): 13–14, incorporated herein by reference in its entirety). Rainfall simulation is therefore designed to simulate three rainfall events. Surface runoff samples are collected and analyzed for pH, electrical conductivity, dissolved inorganic phosphorus, total phosphorus, and dissolved organic carbon (Standard Methods for Water and Wastewater, 20$^{th}$ Edition, 1998, incorporated herein by reference in its entirety).

Example 7

Field Plots

Field demonstration plots receiving control (unamended) and SWAN and FC amended poultry litter are planted with corn using amendment rates derived from results of both incubation (EXAMPLE 4) and greenhouse (EXAMPLE 5) experiments. Three different rates of amendment are investigated for both the SWAN and FC resulting in a total of 7 treatments with three replications. After harvest, the collected corn is dried and weighed so that comparisons in production between control and treated plots are performed. Ground vegetation samples are also analyzed for trace metals according to the methods of (Jones et al., 1911 discussed in Example 5, and again incorporated herein by reference in its entirety).

Thus, a mathematical relationship is established between soil test phosphorus and SWAN-gypsum/iron oxide filter cake amendment rates. In addition, an appropriate formula is derived for determining application rates of SWAN-gypsum and iron oxide filter cake based on soil test phosphorous values and/or desired poultry litter application rates based on crop nitrogen requirements.

All of the references cited herein are incorporated by reference in their entirety.

What is claimed is:

1. A method for reducing an amount of bio-available phosphorus in an organic waste product, liquid wastewater or soil, comprising the step of adding to the organic waste product, liquid wastewater or soil a composition or mixture comprising a byproduct from a titanium dioxide manufacturing process in an amount sufficient to immobilize some or all of the phosphorus present in the organic waste product, liquid wastewater or soil, wherein the byproduct comprises about 2–10% by weight calcium, about 10–20% by weight iron, and about 8% by weight titanium dioxide.

2. The method of claim 1, wherein the byproduct comprises about 5% by weight calcium and about 15% by weight iron.

3. The method of claim 1, wherein said organic waste product is animal waste.

4. The method of claim 3, wherein said animal waste is poultry litter.

5. The method of claim 1, wherein said byproduct is secondary waste acid neutralization gypsum or filter cake.

6. A method for reducing an amount of bio-available phosphorus in an organic waste product, liquid wastewater or soil, comprising the step of adding to the organic waste product, liquid wastewater or soil a composition or mixture comprising a byproduct from a titanium dioxide manufacturing process in an amount sufficient to immobilize some or all of the phosphorus present in the organic waste product, liquid wastewater or soil, wherein the byproduct comprises about 15–50% by weight calcium, about 10–20% by weight iron, and about 2% by weight titanium dioxide.

7. The method of claim 6, wherein the byproduct comprises about 23% by weight calcium and about 11% by weight iron.

8. The method of claim 6, wherein said organic waste product is animal waste.

9. The method of claim 8, wherein said animal waste is poultry litter.

10. The method of claim 6, wherein said byproduct is secondary waste acid neutralization gypsum or filter cake.

11. A method for controlling the growth of an organism in a body of water to which surface-, subsurface-, or ground-water flows, by reducing an amount of soluble phosphorus in a soil from which said water originates, comprising the step of amending the soil to include a mixture comprising a byproduct in an amount sufficient to immobilize some or all of the phosphorus present in the soil; said by-product comprising calcium, iron and titanium dioxide.

12. The method of claim 11, wherein said byproduct is obtained by manufacturing titanium dioxide by chemically processing a titanium dioxide starting material and obtaining said product containing calcium, iron and titanium dioxide.

13. The method of claim 12, wherein the starting material is ore, coke, or slag.

14. The method of claim 12, wherein said chemical process is chlorine based.

15. The method of claim 12, wherein said byproduct comprises about 2–10% by weight calcium, about 10–20% by weight iron, and about 8% by weight titanium dioxide.

16. The method of claim 15, wherein the byproduct comprises about 5% by weight calcium and about 15% by weight iron.

17. The method of claim 16, wherein said chemical process is sulfuric acid based.

18. The method of claim 17, wherein the byproduct comprises about 15–50% by weight calcium, about 10–20% by weight iron, and about 2% by weight titanium dioxide.

19. The method of claim 18, wherein the byproduct comprises about 23% by weight calcium and about 11% by weight iron.

20. The method of claim 11, wherein said organism is algae.

21. The method of claim 11, wherein said organism is bacteria.

22. The method of claim 21, wherein said bacteria is *Pfiesteria*.

23. The method of claim 22, wherein said bacteria is *Pfiesteria piscidia*.

24. A method of controlling eutrophication in a body of water, which comprises the step of reducing an amount of soluble phosphorus flowing into said body of water from surface, subsurface or ground-water flows, by immobilizing some or all of the phosphorus present in a soil through which said surface, subsurface or ground-water flows pass; said immobilizing being effected by a byproduct comprising calcium, iron and titanium dioxide.

25. A method for reducing an amount of bio-available phosphorus in soil contaminated therewith, comprising the step of adding a by-product comprising calcium, iron and titanium dioxide to the soil in an amount sufficient to immobilize some or all of said bio-available phosphorus in the soil.

26. The method of claim 25, wherein the bio-available phosphorus in soil contaminated therewith is from animal waste.

27. The method of claim 26, wherein the animal waste is poultry litter.

28. The method of claim 27, wherein the poultry litter is chicken litter.

29. The method of claim 25, wherein said by-product is secondary waste acid neutralization gypsum or filter cake.

30. The method of claim 25, wherein said by-product is produced by a process which comprises the steps of chemically processing a titanium dioxide-containing starting material.

31. The method of claim 25, wherein said by-product comprises about 2–10% by weight calcium, about 10–20% by weight iron, and about 8% by weight titanium dioxide.

32. The method of claim 31, wherein said calcium is present in the amount of about 5% by weight, and said iron is present in the amount of about 15% by weight.

33. The method of claim 25, wherein said by-product comprises about 15–50% by weight calcium, about 10–20% by weight iron and about 2% by weight titanium dioxide.

34. The method of claim 33, wherein said calcium is present in the amount of about 23% by weight, and said iron is present in the amount of about 11% by weight.

35. The method of claim 5, wherein said filter cake is iron oxide filter cake.

36. The method of claim 29, wherein said filter cake is iron oxide filter cake.

37. The method of claim 25, wherein said amount sufficient to immobilize some or all of said bio-available phosphorus in the soil is determined by a process comprising the steps of:

a) reassuring soil phosphorus content by soil testing, and b) referring to an incubation experiment to determine an amendment amount.

38. The method of claim 24, wherein said same or all of the phosphorous in the soil is from animal waste.

39. The method of claim 38, wherein said animal waste is poultry litter.

40. The method of claim 39, wherein said poultry litter is chicken litter.

* * * * *